(12) United States Patent
Arnold et al.

(10) Patent No.: US 11,023,169 B2
(45) Date of Patent: Jun. 1, 2021

(54) IDENTIFYING PERFORMANCE IMPACT EVENTS IN DATA STORAGE EQUIPMENT BASED ON QUEUE DEPTH METRICS

(71) Applicant: EMC IP Holding Company LLC, Hopkinton, MA (US)

(72) Inventors: Zachary Arnold, Concord, MA (US); Peter Beale, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/390,534

(22) Filed: Apr. 22, 2019

(65) Prior Publication Data

US 2020/0333978 A1     Oct. 22, 2020

(51) Int. Cl.
*G06F 3/06* (2006.01)

(52) U.S. Cl.
CPC ............ *G06F 3/0659* (2013.01); *G06F 3/067* (2013.01); *G06F 3/0613* (2013.01); *G06F 3/0662* (2013.01)

(58) Field of Classification Search
CPC ...... G06F 3/0659; G06F 3/0613; G06F 3/067; G06F 5/06; G06F 3/0662; G06F 3/0653; G06F 3/0671; G06F 3/061; G06Q 10/063114; H04L 47/6255; H04L 67/1008
USPC ................ 710/5, 18, 29, 34, 39, 52, 54, 310
See application file for complete search history.

(56) References Cited

U.S. PATENT DOCUMENTS

| | | | |
|---|---|---|---|
| 6,711,137 B1 * | 3/2004 | Klassen | H04L 41/142 370/252 |
| 7,739,470 B1 * | 6/2010 | Norgren | G06F 11/3409 711/168 |
| 7,949,123 B1 * | 5/2011 | Flockhart | G06Q 30/0281 379/266.03 |
| 8,015,327 B1 | 9/2011 | Zahavi et al. | |
| 8,775,549 B1 | 7/2014 | Taylor | |
| 8,868,797 B1 | 10/2014 | Kirac et al. | |
| 8,898,357 B1 | 11/2014 | Burke | |
| 9,335,945 B2 * | 5/2016 | Jayaraman | G06F 3/0646 |
| 9,354,813 B1 | 5/2016 | Dolan et al. | |
| 9,459,799 B1 * | 10/2016 | Naamad | G06F 11/3419 |
| 9,760,392 B1 * | 9/2017 | Dantkale | G06F 9/45558 |
| 9,870,434 B1 | 1/2018 | Ratsaby et al. | |

(Continued)

FOREIGN PATENT DOCUMENTS

EP     1096737 A2 *   5/2001   ............. H04L 47/10

*Primary Examiner* — Idriss N Alrobaye
*Assistant Examiner* — Henry W Yu
(74) *Attorney, Agent, or Firm* — BainwoodHuang

(57) ABSTRACT

A technique manages data storage equipment. The technique involves receiving queue depth metrics from data storage performance data describing data storage performance of the data storage equipment. The technique further involves performing a performance impact detection operation on the queue depth metrics to determine whether a performance impacting event has occurred on the data storage equipment. The technique further involves, in response to a result of the performance impact detection operation indicating that a performance impacting event has occurred on the data storage equipment, launching a set of performance impact operations to address the performance impacting event that occurred on the data storage equipment. Such a technique may be performed by an electronic apparatus coupled with the data storage equipment (e.g., over a network).

20 Claims, 8 Drawing Sheets

(56) References Cited

U.S. PATENT DOCUMENTS

| | | | | |
|---|---|---|---|---|
| 10,642,764 | B1* | 5/2020 | Gerhart | G06F 12/10 |
| 2002/0103923 | A1* | 8/2002 | Cherian | G06F 3/067 |
| | | | | 709/235 |
| 2004/0244007 | A1* | 12/2004 | Garza | G06F 9/546 |
| | | | | 718/105 |
| 2007/0124728 | A1* | 5/2007 | Rosenbluth | G06F 9/526 |
| | | | | 718/100 |
| 2010/0191876 | A1* | 7/2010 | Muppirala | G06F 3/0613 |
| | | | | 710/39 |
| 2015/0120907 | A1* | 4/2015 | Niestemski | H04L 41/0883 |
| | | | | 709/224 |
| 2015/0355861 | A1* | 12/2015 | Jayaraman | G06F 3/0656 |
| | | | | 711/103 |
| 2016/0149766 | A1* | 5/2016 | Borowiec | G06F 21/31 |
| | | | | 715/735 |
| 2016/0197799 | A1* | 7/2016 | Clemm | H04L 41/0803 |
| | | | | 709/202 |

* cited by examiner

IDENTIFYING PERFORMANCE IMPACT EVENTS IN DATA STORAGE EQUIPMENT BASED ON QUEUE DEPTH METRICS

BACKGROUND

Data storage systems include storage processors and storage devices. The storage processors process host input/output (I/O) requests (e.g., SCSI commands, file access commands, etc.) from host computers by writing host data into and reading host data from the storage devices.

During such operation, human administrators may monitor operation of the data storage systems. In particular, using a computerized monitoring device, a human administrator may display certain operating statistics of a particular data storage system and observe trends in data storage system operation (e.g., graphs of I/O operations per second (IOPS), latency over time, etc.). If the human administrator sees a deteriorating trend, the human administrator may then be able to diagnose and correct the issue causing the deteriorating trend.

SUMMARY

Unfortunately, there are deficiencies to the above described conventional approach to simply displaying certain operating statistics of a particular data storage system to a human administrator to enable the human administrator to observe, diagnose and correct data storage system issues. For example, such an approach often requires significant training and experience before the human administrator is able to understand how to spot, diagnose and/or correct such issues. Additionally, more straightforward methods to identifying these issues may be available, but such methods may not lend themselves well to visual detection by the human administrator (e.g., certain visual trends may be too subtle or tricky to discern via simple viewing).

In contrast to the above-described conventional approach to simply displaying certain operating statistics of a particular data storage system to enable a human administrator to observe, diagnose and correct data storage system issues, improved techniques for managing data storage equipment are directed to identifying performance impact events occurring on the data storage equipment based on queue depth metrics. Such queue depth metrics may be computed from other performance data that is routinely received from the data storage equipment (e.g., I/O operations per second (IOPS) data, latency data, etc.) and used to identify a time frame within which a possible performance impact event has occurred. Once the time frame has been identified, particular performance data for that time frame may be evaluated against predefined criteria (e.g., covariances in certain data time series, correlations between certain data, whether certain data exceeds certain thresholds, etc.) to identify whether an actual performance impact event took place. If it is concluded that an actual performance impact event took place, a set of performance impact operations may be launched to address the performance impact event.

One embodiment is directed to a method of managing data storage equipment. Such a method may be performed by an electronic apparatus coupled with the data storage equipment (e.g., over a network). The method includes receiving queue depth metrics from data storage performance data describing data storage performance of the data storage equipment. The method further includes performing a performance impact detection operation on the queue depth metrics to determine whether a performance impacting event has occurred on the data storage equipment. The method further includes, in response to a result of the performance impact detection operation indicating that a performance impacting event has occurred on the data storage equipment, launching a set of performance impact operations to address the performance impacting event that occurred on the data storage equipment.

In accordance with certain embodiments, the performance impact detection operation is performed on additional data as well. Such data may include latency, IOPS, IO-size, percentage reads, combinations thereof, etc.

In some arrangements, receiving the queue depth metrics from the data storage performance data includes acquiring IOPS data and latency data from the data storage equipment. Receiving the queue depth metrics further includes deriving the queue depth metrics from the IOPS data and the latency data acquired from the data storage equipment.

In some arrangements, the queue depth metrics includes a series of time-specific queue depth values, each time-specific queue depth value representing an average queue depth for the data storage equipment over the sample period ending at a respective point in time. Additionally, performing the performance impact detection operation on the queue depth metrics includes, from the series of time-specific queue depth values, computing an average queue depth value over a predefined period of time (or time window), and identifying, within the predefined period of time, a time range in which a portion of the series of time-specific queue depth values exceeds the average queue depth value.

In some arrangements, performing the performance impact detection operation on the queue depth metrics further includes performing a set of comparison operations to determine whether time-specific queue depth values of the portion of the series of time-specific queue depth values exceeds the average queue depth value by a predefined queue depth threshold. Along these lines, a ratio such as the time-specific queue depth exceeding twice (2x) the average queue depth has been determined to provide acceptable results in identifying a time frame in which a possible performance impact event has occurred. Nevertheless, other queue depth thresholds are suitable for use as well (e.g., 1.5x, 1.8x, 2.2x, 2.5x, and so on).

If one or more of the time-specific queue depth values of the portion of the series of time-specific queue depth values exceeds the average queue depth value by the predefined queue depth threshold, a set of evaluation operations on the data storage performance data may be performed. Examples of evaluations that may signify occurrence of a performance impact event include discovery of negative covariance between IOPS and latency (within a predefined threshold) during the time range, whether average IOPS during the time range is lower than the average IOPS during the entire time window, whether a strong positive or negative correlation exists between raw latency and percentages of read operations over the time range, and whether a strong correlation exists between raw latency and I/O size (i.e., the size of the data in the I/O request) over the time range. Other evaluation and filtering operations are suitable as well.

It should be understood that different evaluations may be performed for online analytical processing (OLAP) and for online transaction processing (OLTP). For OLAP, evaluation is performed using raw queue depth values. However, for OLTP, evaluation is performed using "virtual" queue depth values, e.g., where the virtual queue depth value may be computed using Little's Law (Q=IOPS*latency) holding the IOPS constant at the average value and the raw latency values.

Once a performance impact event has been detected, a set of computerized remedial operations may be performed. An example remedial operation includes, in a graphical user interface (GUI) window that displays a chart of particular data storage performance of the data storage equipment versus time, highlighting at least a portion of the chart to identify occurrence of the performance impact event. Another example remedial operation includes transmitting an alert notification to a client device to identify occurrence of the performance impact event to a user of the client device. Yet another example remedial operation includes providing a set of commands to the data storage equipment to adjust operation of the data storage equipment, and so on.

Another embodiment is directed to electronic circuitry which includes a communications interface constructed and arranged to communicate with the data storage equipment, memory, and control circuitry coupled to the communications interface and the memory. The memory stores instructions which, when carried out by the control circuitry, cause the control circuitry to:
- (A) receive queue depth metrics and other metrics (e.g., IOPS, latency, IO-size, percentage reads) from data storage performance data describing data storage performance of data storage equipment, at least some of the data storage performance data having been received through the communications interface,
- (B) perform a performance impact detection operation on the queue depth metrics to determine whether a performance impacting event has occurred on the data storage equipment, and
- (C) in response to a result of the performance impact detection operation indicating that a performance impacting event has occurred on the data storage equipment, launch a set of performance impact operations to address the performance impacting event that occurred on the data storage equipment.

Yet another embodiment is directed to a computer program product having a non-transitory computer readable medium which stores a set of instructions to manage data storage equipment. The set of instructions, when carried out by computerized circuitry, causes the computerized circuitry to perform a method of:
- (A) receiving queue depth metrics and other metrics (e.g., IOPS, latency, IO-size, percentage reads) from data storage performance data describing data storage performance of the data storage equipment;
- (B) performing a performance impact detection operation on the queue depth metrics to determine whether a performance impacting event has occurred on the data storage equipment; and
- (C) in response to a result of the performance impact detection operation indicating that a performance impacting event has occurred on the data storage equipment, launching a set of performance impact operations to address the performance impacting event that occurred on the data storage equipment.

It should be understood that, in the cloud context, at least some of the electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in identifying performance impact events in data storage equipment using queue depth metrics.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to identifying performance impact events occurring in data storage equipment based on queue depth metrics. Such queue depth metrics may be generated from other performance data that is routinely received from the data storage equipment (e.g., input/output operations per second (IOPS) data, latency data, etc.) and used to identify a time frame within which a possible performance impact event may have occurred. Once the time frame has been identified, particular performance data for that time frame may be evaluated against predefined criteria (e.g., covariances in certain data time series, correlations between certain data, whether certain data exceeds certain thresholds, etc.) to identify whether an actual performance impact event took place. If it is concluded that an actual performance impact event took place, a set of performance impact operations may be launched to address the performance impact event.

Figure 1:
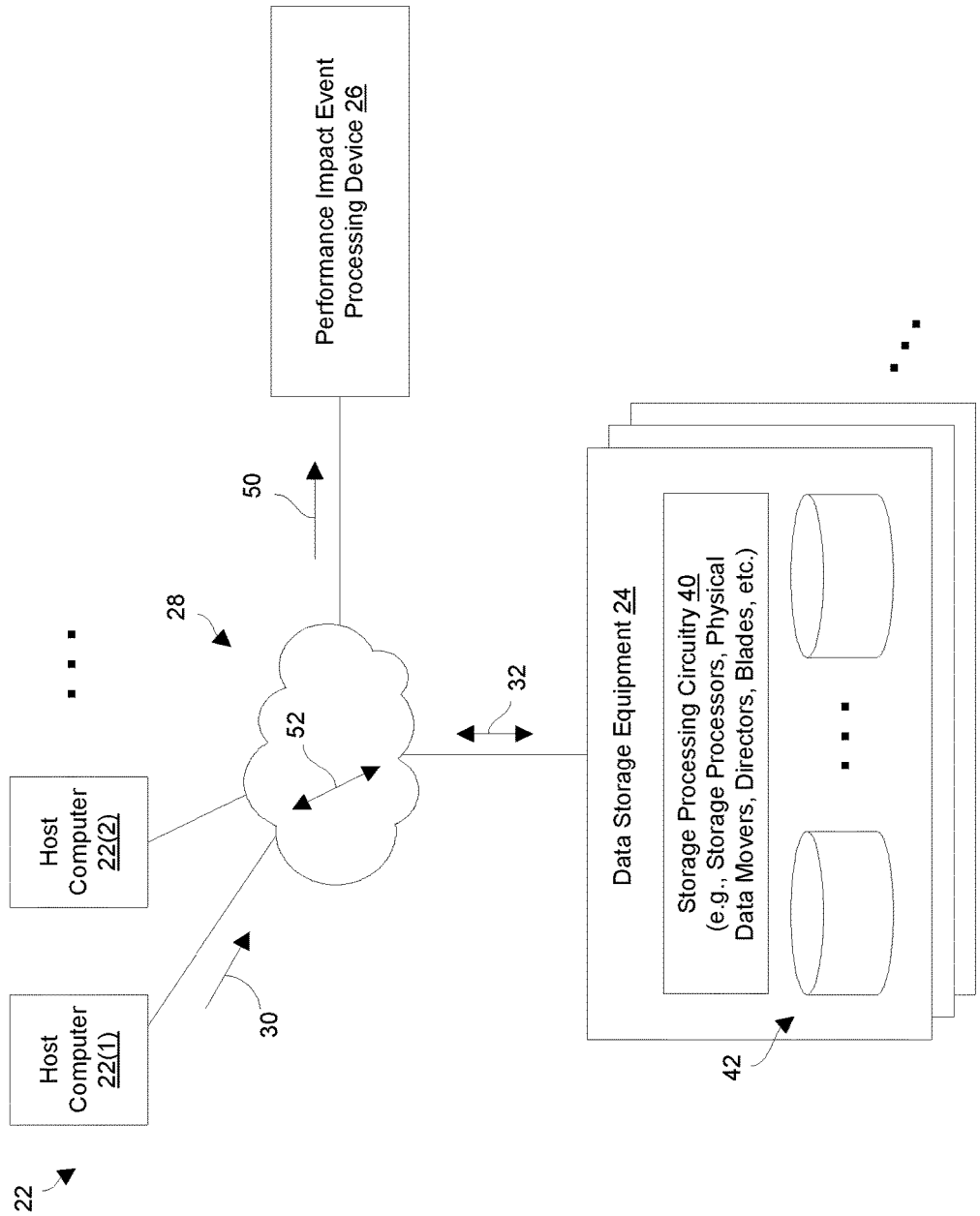
FIG. 1 is a block diagram of a data storage environment which identifies performance impact events within data storage equipment in accordance with certain embodiments.

FIG. 1 shows a data storage environment 20 which identifies and addresses performance impact events within data storage equipment. The data storage environment 20 includes host computers 22(1), 22(2), . . . (collectively, host computers 22), data storage equipment 24, a performance impact event processing device 26, and a communications medium 28.

Each host computer 22 is constructed and arranged to perform useful work. For example, one or more of the host computers 22 may operate as a file server, a web server, an email server, an enterprise server, a database server, a transaction server, combinations thereof, and the like which provides host input/output (I/O) requests 30 to the data storage equipment 24. Other situations are suitable for use as well such as cluster configurations, server farms, cloud infrastructures, enterprise settings, etc. In these contexts, the host computers 22 may provide a variety of different I/O requests 30 (e.g., file access requests, block-based access requests, combinations thereof, etc.) that direct the data storage equipment 24 to store host data 32 within and retrieve host data 32 from one or more data storage containers (e.g., a file, a file system, a logical unit of storage or LUN, a volume, a virtual volume or VVol, etc.).

The data storage equipment 24 includes storage processing circuitry 40 and storage devices 42. The storage processing circuitry 40 is constructed and arranged to respond to the host I/O requests 30 from the host computers 22 by writing host data 32 into the storage devices 42 and reading host data 32 from the storage devices 42 (e.g., solid state drives, magnetic disk drives, combinations thereof, etc.). The storage processing circuitry 40 may include one or more physical storage processors or engines, data movers, director boards, blades, I/O modules, storage device controllers, switches, other hardware, combinations thereof, and so on. While processing the host I/O requests 30, the storage processing circuitry 40 may provide a variety of specialized data storage system services such as caching, tiering, deduplication, compression, encryption, mirroring, providing RAID (redundant array of independent disks) protection, snapshotting, backup/archival services, replication, and so on.

Additionally, the storage processing circuitry 40 may provide data storage performance data 50 (e.g., IOPS data, latency data, percentage of read operations, etc.) to the performance impact event processing device 26. Such data storage performance data 50 may be sent routinely (e.g., every minute, 5 minutes, 15 minutes, etc.). Furthermore, such data storage performance data 50 may include individual and/or aggregated metrics (i.e., for the data storage equipment 24 overall, for individual storage objects such as LUNS, file systems, RAID groups, combinations thereof, etc.).

The storage devices 42 may be co-located with the storage processing circuitry 40. Alternatively, the storage devices 42 reside in a separate location (e.g., a separate storage device assembly/array/enclosure/etc.).

Additionally, the data storage equipment 24 may take a variety of topologies. In some arrangements, all of the data storage equipment 24 resides in a single location (e.g., a single cabinet, lab, room, floor, building, campus, etc.). In other arrangements, the data storage equipment 24 includes components that are distributed among multiple locations (e.g., different corners of a room, floors, buildings, campuses, towns, states, coasts, countries, etc.).

Furthermore, the data storage equipment 24 make take a variety of different forms such as one or more disk array enclosures, rack mount equipment, electronic cabinets, data storage arrays, and/or assemblies, distributed equipment, combinations thereof, and so on. Moreover, the data storage equipment 24 is capable of performing different data storage operations, e.g., file-based operations, block-based operations, combinations thereof, etc.

The performance impact event processing device 26 is constructed and arranged to identify and address performance impact events occurring within the data storage equipment 24. The performance impact event processing device 26 may be dedicated to performing such operation or perform other operations as well (e.g., storage management, administration, etc.). Furthermore, the performance impact event processing device 26 may be implemented via a variety of different form factors such as a service processor, a host computer or portion thereof, a portion of storage enclosure or array, an external server device, a data storage appliance, a workstation, a laptop computer, a mobile device, etc. In some arrangements, the performance impact event processing device 26 manages multiple data storage equipment installations simultaneously.

The communications medium 28 is constructed and arranged to connect the various components of the data storage environment 20 together to enable these components to exchange electronic signals 52 (e.g., see the double arrow 52). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the host devices 22 send host I/O requests 30 to the data storage equipment 24 for processing. In response, the storage processing circuitry 40 of the data storage equipment 24 robustly and reliably performs host I/O operations such as writing host data 32 into and reading host data 32 from the storage devices 42.

During such operation, the storage processing circuitry 40 of the data storage equipment 24 provides data storage performance data 50 to the performance impact event processing device 26 through the communications medium 28. The performance impact event processing device 26 evaluates the performance data 50 to identify performance impact events occurring within the data storage equipment 24 and, upon identification of a performance impact event, launches a set of performance impact operations to address the performance impacting event.

The data storage performance data 50 may include information regarding individual storage objects of the data storage equipment 24 such as respective IOPS (or other throughput data), respective latency, respective percentage of read operations, etc. for each LUN. The data storage performance data 50 may further include aggregated data such as overall IOPS, overall latency, overall percentage of read operations, etc.

In accordance with some arrangements, the data storage performance data 50 provided by the data storage equipment 24 to the performance impact event processing device 26 may include actual queue depth metrics from the data storage equipment 24. In other arrangements, virtual queue depth metrics may be derived from other data storage performance data 50 (e.g., the application of Little's Law to IOPS and latency to determine queue depth).

The set of performance impact operations that addresses a performance impact event may include highlighting particular details of the event to a user, outputting an alert, adjusting operation of the data storage equipment 24, combinations thereof, and so on. For example, highlighting the particular details of the event may include delineating or accentuating certain performance data curves on a display such as a graphical user interface (GUI) for the user. As another example, outputting the alert may include sending a push notification, text message and/or email to a user device of a human administrator. As yet another example, adjusting operation of the data storage equipment 24 may include increasing or adding one or more resources, throttling one or more workloads, migrating one or more workloads, adjusting one or more storage policies/rules/parameters/etc., other scaling operations, combinations thereof, and so on. Further details will now be provided with reference to FIG. 2.

Figure 2:
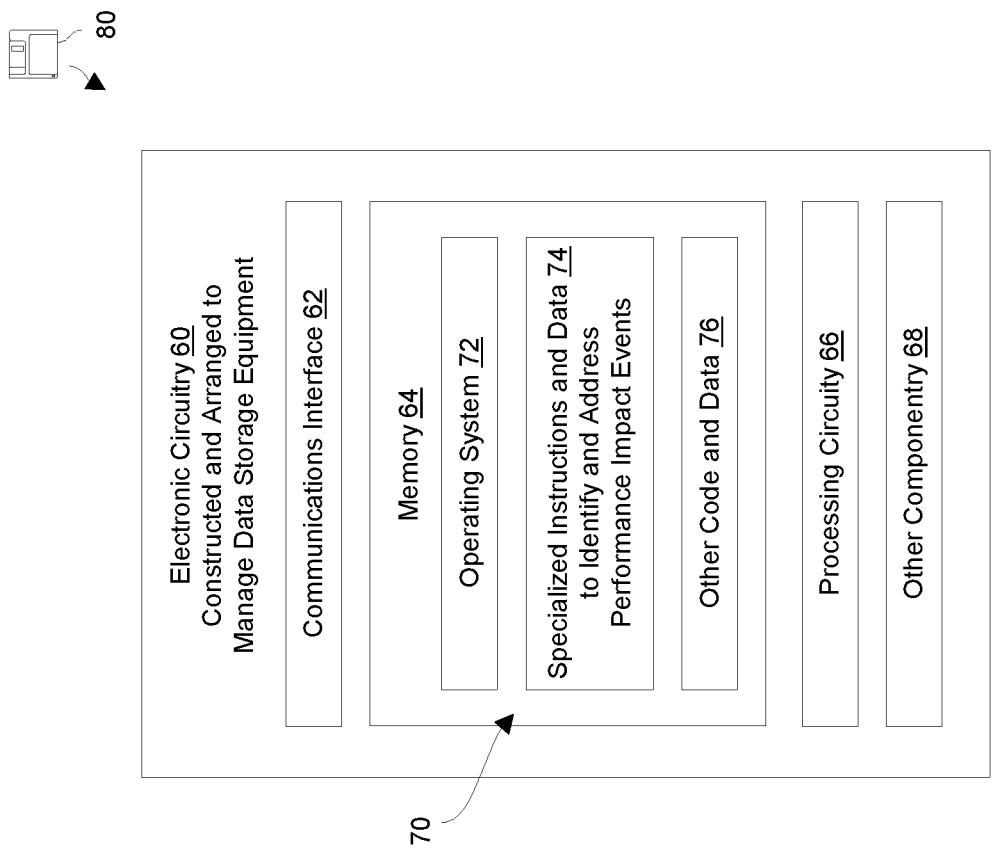
FIG. 2 is a block diagram of electronic circuitry of the data storage environment of FIG. 1 in accordance with certain embodiments.

FIG. 2 shows electronic circuitry 60 which is suitable for use within the data storage environment 20 in accordance with certain embodiments. Along these lines, the electronic circuitry 60 may form at least a portion of the performance impact event processing device 26 (also see FIG. 1) which manages one or more data storage equipment installations. The electronic circuitry 60 includes a communications interface 62, memory 64, and processing circuitry 66, and other componentry 68.

The communications interface 62 is constructed and arranged to connect the electronic circuitry 60 to the communications medium 28 (also see FIG. 1) to enable communications with other devices of the data storage environment 20 (e.g., the data storage equipment 24, the host computers 22, etc.). Such communications may be IP-based, SAN-based, cable-based, fiber-optic based, wireless, combinations thereof, and so on. Accordingly, the communications interface 62 enables the electronic circuitry 60 to robustly and reliably communicate with other external apparatus.

The memory 64 is intended to represent both volatile storage (e.g., DRAM, SRAM, etc.) and non-volatile storage (e.g., flash memory, magnetic memory, etc.). The memory 64 stores a variety of software constructs 70 including an operating system 72, specialized instructions and data 74, and other code and data 76. The operating system 72 refers to particular control code such as a kernel to manage computerized resources (e.g., processor cycles, memory space, etc.), drivers (e.g., an I/O stack), and so on. The specialized instructions and data 74 refers to code that enables electronic circuitry 60 to identify and address performance impact events. In some arrangements, the specialized instructions and data 74 is tightly integrated with or part of the operating system 72 itself The other code and data 76 refers to applications and routines to provide additional operations and services (e.g., configuration tools, etc.), user-level applications, administrative tools, utilities, and so on.

The processing circuitry 66 is constructed and arranged to operate in accordance with the various software constructs 70 stored in the memory 64. As will be explained in further detail shortly, the processing circuitry 66 executes at least some of the specialized instructions and data 74 to form specialized circuitry which manages one or more data storage equipment installations (e.g., to detect performance impact events occurring within the data storage equipment 24, to notify a user, to adjust operation of the data storage equipment 24, etc.).

It should be understood that the specialized instructions and data 74 may include a repository (or log) of data storage performance data 50 received from one or more data storage equipment installations. Such a repository may store such performance data 50 permanently (i.e., indefinitely) or temporarily (e.g., buffered for a few days, a week, a month, etc.).

Such processing circuitry 66 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic circuitry 60. In particular, the computer program product 80 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, flash memory, disk memory, tape memory, and the like.

The other componentry 68 refers to other hardware of the electronic circuitry 60. Along these lines, the electronic circuitry 60 may include a user interface, specialized graphics hardware, etc. Further details will now be provided with reference to FIGS. 3 through 5.

Figure 3:
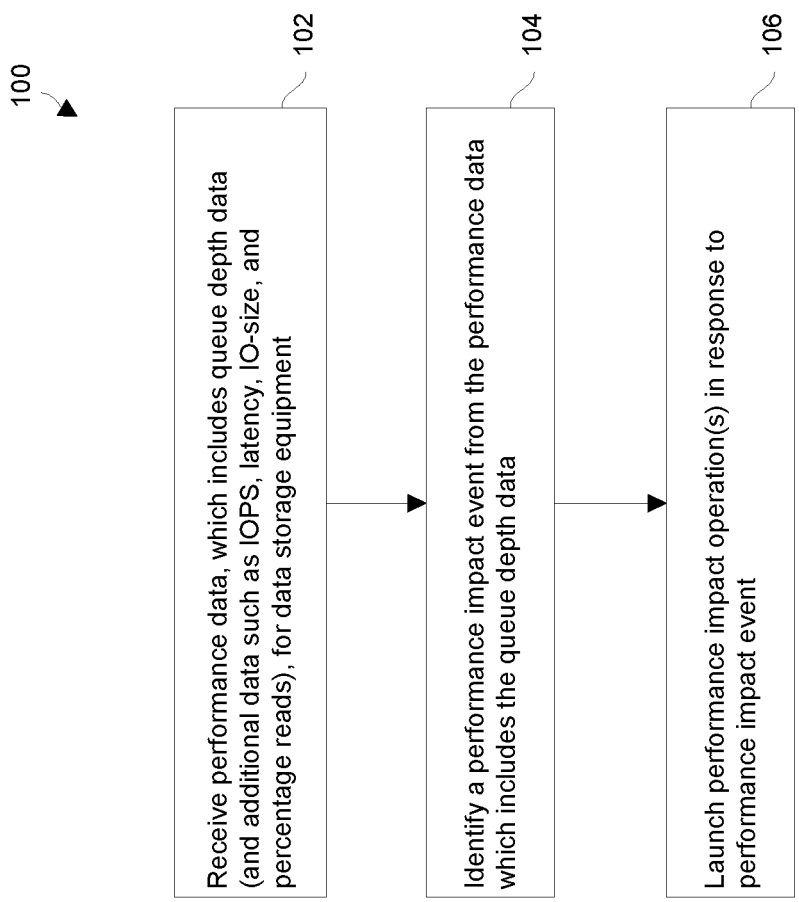
FIG. 3 is a flowchart of a procedure which is performed by the data storage environment in accordance with certain embodiments.
Figure 4:
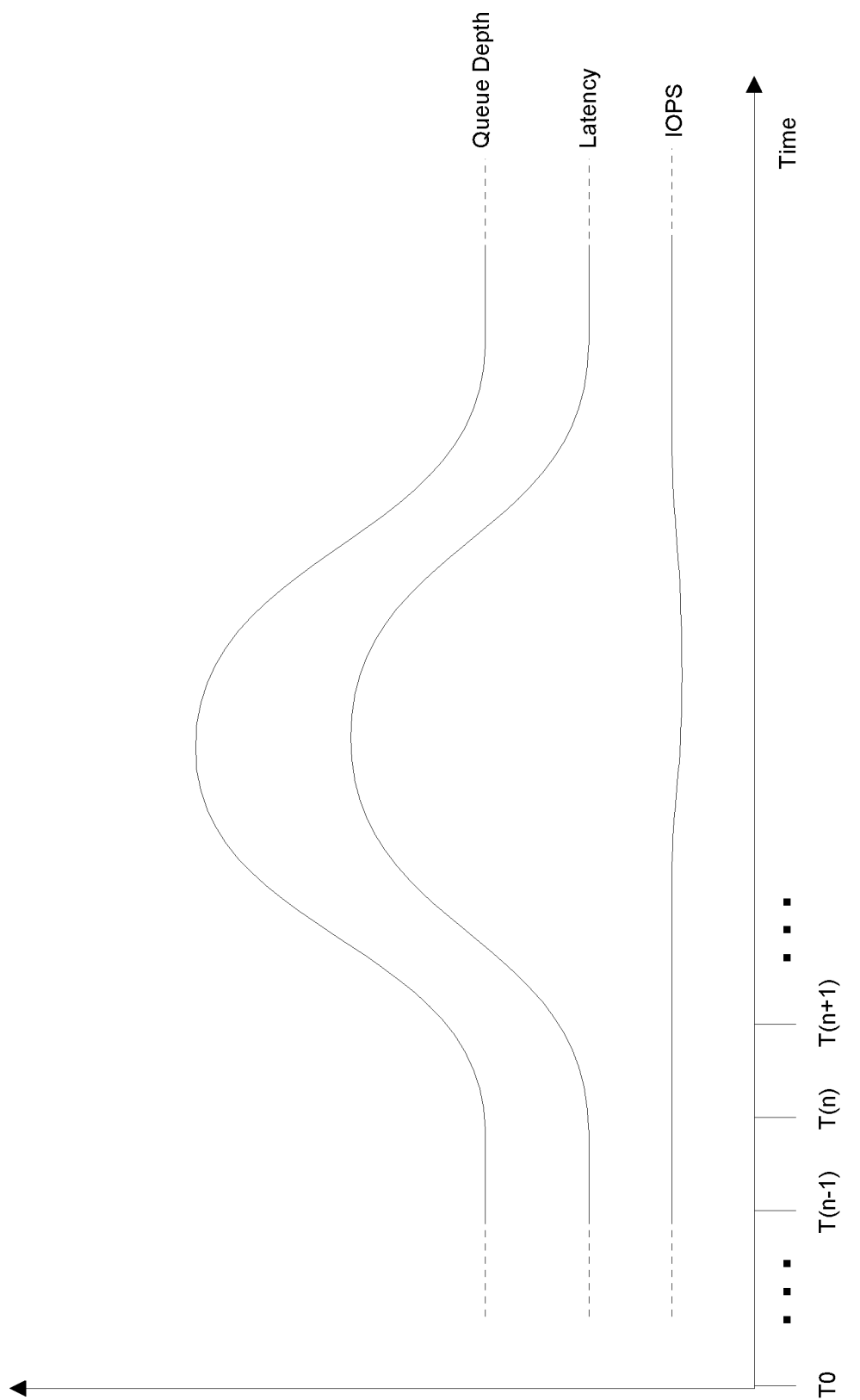
FIG. 4 is a chart of example performance data when data storage equipment of the data storage environment operates on a workload having online transaction processing (OLTP) behavior in accordance with certain embodiments.
Figure 5:
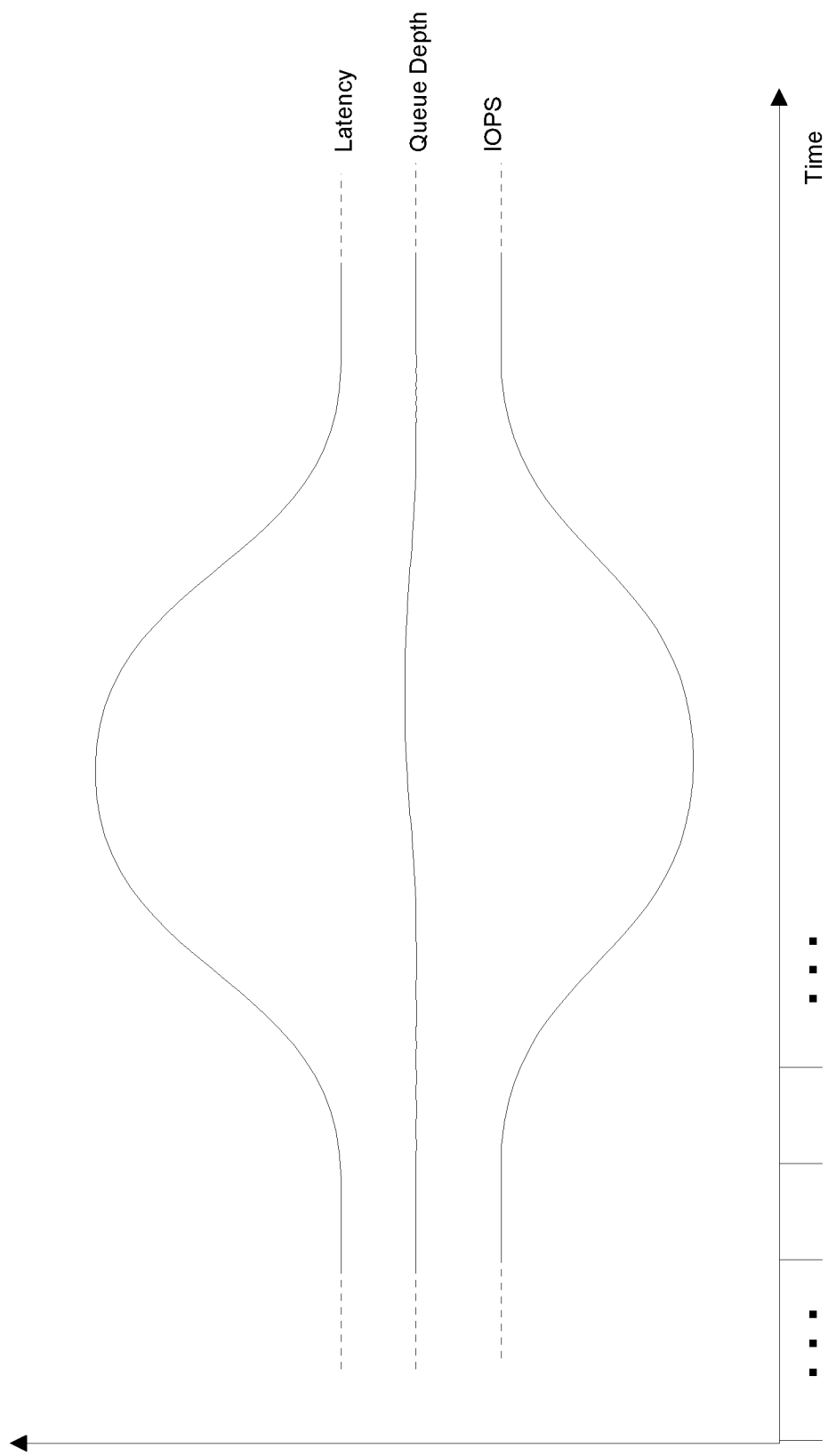
FIG. 5 is a chart of example performance data when data storage equipment of the data storage environment operates on a workload having online analytical processing (OLAP) behavior in accordance with certain embodiments.

FIGS. 3 through 5 provide certain operating details of the data storage environment 20 in accordance with certain embodiments. FIG. 3 is a flowchart of a procedure 100 which is performed by the performance impact event processing device 26 to identify and address a performance impact event occurring within a data storage equipment installation (also see the data storage equipment 24 in FIG. 1). FIG. 4 is a chart of example performance data when the data storage equipment 24 operates on a workload having online transaction processing (OLTP) behavior. FIG. 5 is a chart of example performance data when the data storage equipment 24 operates on a workload having online analytical processing (OLAP) behavior.

With regard to the procedure 100 and with reference to FIG. 3, at 102, specialized circuitry of the performance impact event processing device 26 receives performance data 50 which includes queue depth data for the data storage equipment 24 under evaluation. One should appreciate that queue depth may be derived from IOPS and latency data using Little's Law where:

$$\text{Queue Depth} = \text{IOPS} \times \text{Latency} \qquad \text{Equation (1).}$$

In some arrangements, queue depth is included in the performance data 50 routinely provided to performance impact event processing device 26 from the data storage equipment 24. In other arrangements, the performance impact event processing device 26 generates queue depth data from IOPS and latency provided to performance impact event processing device 26 from the data storage equipment 24. It should be understood that the performance impact event processing device 26 may store at least some of the performance data in a repository (or log) (also see the specialized instructions and data 74 in FIG. 2).

FIG. 4 shows example curves of IOPS, latency, and queue depth versus time for particular data storage equipment 24 under evaluation. By way of example, the IOPS (or throughput) of the data storage equipment 24 is relatively constant. Such may be the case in online banking, in online payments, as database transactions, etc. where the host computers 22 provide I/O requests 30 to the data storage equipment 24 in a relatively steady stream. Accordingly, the data storage equipment 24 may be viewed as processing a workload that exhibits OLTP-style behavior.

As further shown in FIG. 4, since IOPS is relatively constant, queue depth tends to mirror latency in satisfaction of Little's Law (also see Equation (1) above). That is, any increase (or decrease) in latency results in an increase (or decrease) in queue depth.

FIG. 5 shows other example curves of IOPS, latency, and queue depth versus time for other data storage equipment 24 under evaluation. By way of example, queue depth is relatively stable but IOPS may vary. Such may be the case where the host computers 22 provide I/O requests 30 to the data storage equipment 24 in bursts or in an ad-hoc manner. Accordingly, the data storage equipment 24 may be viewed as processing a workload that exhibits OLAP-style behavior.

As further shown in FIG. 5, since queue depth is relatively constant (e.g., constrained by limited resources), any variation in IOPS is usually accompanied by an opposite variation in latency. That is, if IOPS drops (or increases) due to a variation in the workload, latency rises (or decreases) thus providing a relatively constant queue depth (also see Equation (1) above).

At 104, the specialized circuitry of the performance impact event processing device 26 identifies a performance impact event from the performance data. In particular, the specialized circuitry may perform a performance impact detection operation on the queue depth metrics which determines that a performance impacting event has occurred on the data storage equipment 24 under evaluation. As will be explained in further detail shortly, such identification may involve evaluating the queue depth data for time ranges in which performance impact events may have occurred. If the specialized circuitry identifies such a time range, the specialized circuitry may then further analyze the performance data for the data storage equipment (e.g., various data time series captured in the repository) to determine whether an actual performance impact event occurred.

At 106, the specialized circuitry launches a set of performance impact operations in response to identification of the performance impact event. In some arrangements, the set of performance impact operations is launched automatically to address the performance impact event to address the performance impact event as quickly as possible.

The set of performance impact operations may include highlighting particular details of the performance impact event to a user (e.g., delineate portions of charts in a graphical user interface (GUI) to show when the performance impact event occurred, etc.), outputting an alert, adjusting operation of the data storage equipment 24, combinations thereof, and so on. Further details will now be provided with reference to FIGS. 6 through 8.

Figure 6:
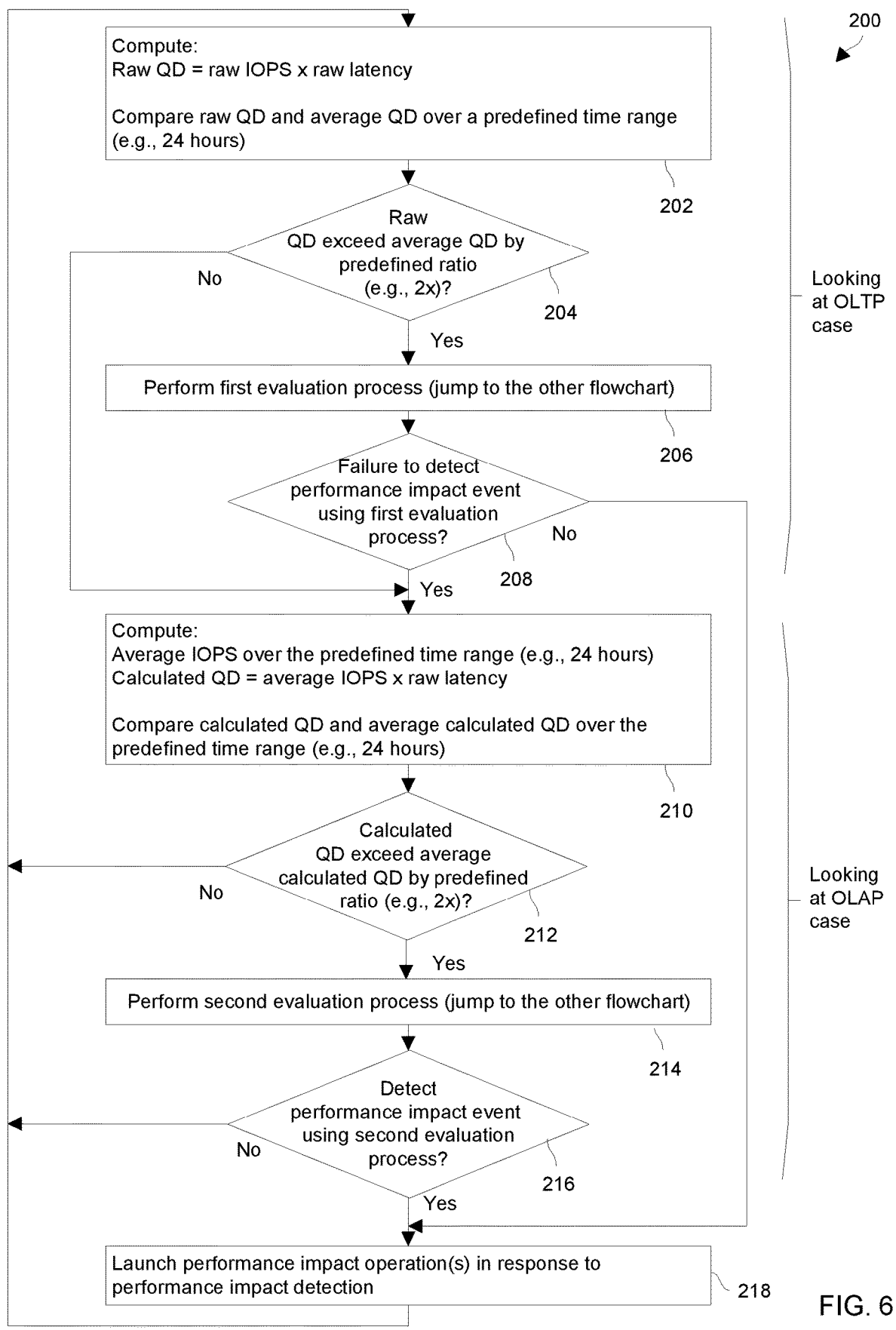
FIG. 6 is a flowchart of a procedure including particular activities that are performed by the data storage environment when identifying and addressing a performance impact event in accordance with certain embodiments.
Figure 7:
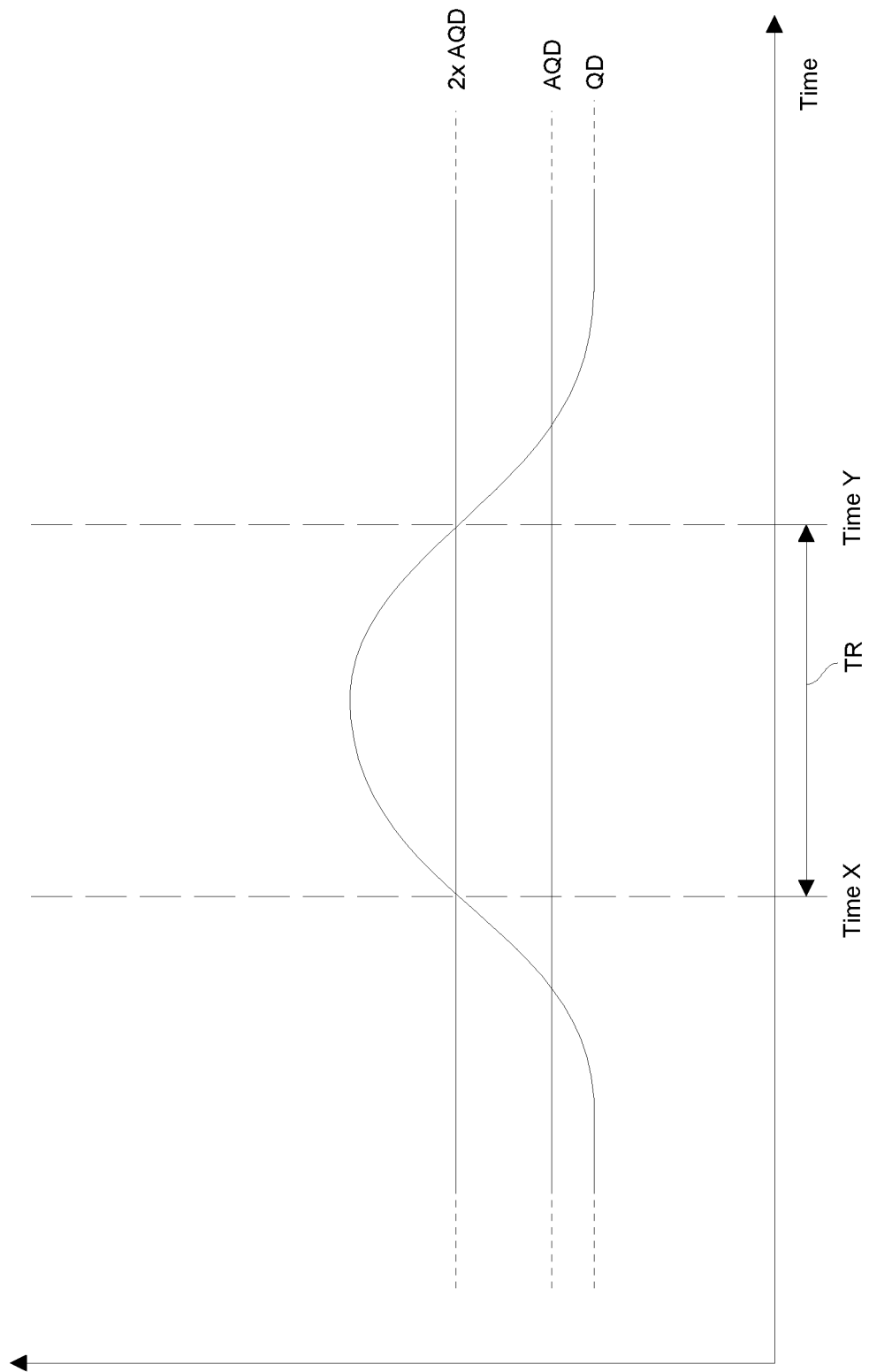
FIG. 7 is a chart of example queue depth data which is evaluated to identify a time range within which a performance impact event may have occurred in accordance with certain embodiments.
Figure 8:
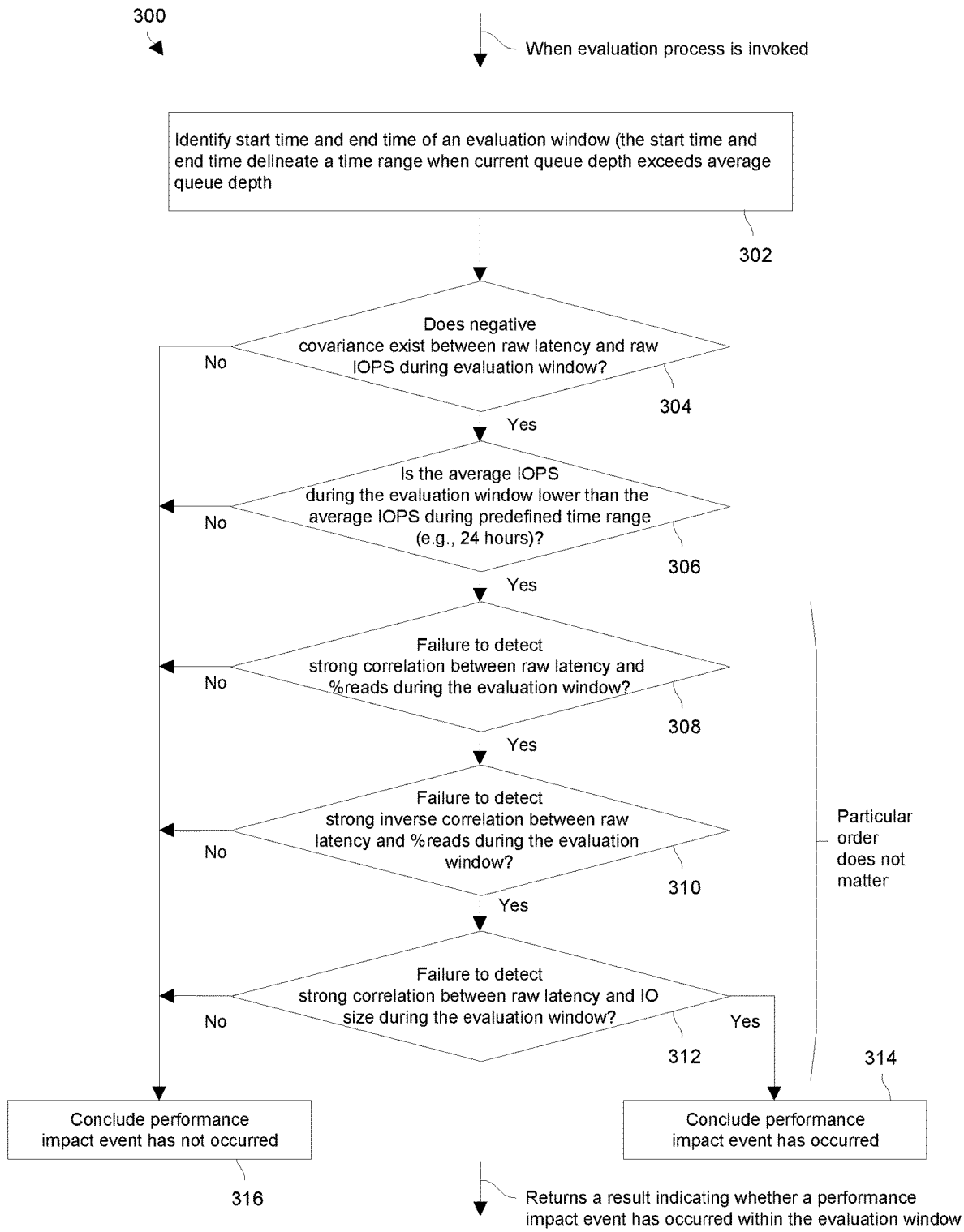
FIG. 8 is a flowchart of a procedure including example evaluation operations that are performed by the performance impact event processing device when identifying a performance impact event in accordance with certain embodiments.

FIGS. 6 through 8 provide particular operating details of the data storage environment 20 in accordance with certain embodiments. FIG. 6 is a flowchart of a procedure 200 including particular activities that are performed by the performance impact event processing device 26 when identifying and addressing a performance impact event occurring within a data storage equipment installation. FIG. 7 is a chart of queue depth which is evaluated to identify a time range within which a performance impact event may have occurred. FIG. 8 is a flowchart of a procedure 300 which includes a set of example evaluation operations that may be performed by the performance impact event processing device 26 to determine whether a performance impact event has occurred within the data storage equipment 24 under evaluation.

With reference to FIG. 6, at 202 of the procedure 200, the specialized circuitry of the performance impact event processing device 26 processes queue depth data. As mentioned earlier, in some arrangements, the specialized circuitry acquires the queue depth data directly from the data storage equipment 24. In other arrangements, the specialized circuitry locally generates the queue depth data from the other data storage performance data 50 received from the data storage equipment 24 (e.g., also see FIG. 1). In either arrangement, the specialized circuitry may be able to access the queue depth data as a time series. Along these lines, the specialized circuitry may maintain and retrieve the queue depth data locally from a repository (e.g., also see the specialized instructions and data 74 in FIG. 2).

At 204, the specialized circuitry performs a preliminary evaluation to determine whether a performance impact event has occurred. In particular, the specialized circuitry compares raw queue depth (QD) to average queue depth (AQD) to determine whether the QD exceeds the AQD by a predefined threshold (e.g., a ratio). Suitable predefined thresholds include 150% of the AQD, 200% of the AQD (or 2 times the AQD), 250% of the AQD, and so on. Furthermore, a suitable time period over which the AQD is computed is 24 hours although other amounts of time are suitable for use as well (e.g., 8 hours, 12 hours, 48 hours, etc.).

Recall that Equation (1) (provided earlier) shows how queue depth may be derived from IOPS and latency. Accordingly, the raw (or time-specific) queue depth (QD) at a particular time may be computed based on raw IOPS at that time and raw latency at that time. Moreover, a time series for at least some of this data may be depicted as shown in FIG. 7.

If the QD exceeds the AQD by the predefined threshold, the specialized circuitry proceeds from 204 to 206 to perform a closer evaluation. However, if the QD does not exceed the AQD by the predefined threshold, the specialized circuitry proceeds from 204 to 210 to continue other performance impact event evaluation.

By way of example, suppose that the specialized circuitry considers a performance impact event to possibly have occurred if the QD exceeds 2 times the AQD (i.e., the predefined threshold is "by a factor of 2"). Accordingly, if at least a portion of the QD time series exceeds 2 times the AQD, the specialized circuitry proceeds from 204 to 206 to perform closer evaluation. However, if no portion of the QD time series exceeds 2 times the AQD, the specialized circuitry proceeds from 204 to 210.

FIG. 7 shows, by way of example, a first curve of average queue depth (AQD) which is averaged over 24 hours (e.g., a predefined 24-hour evaluation time period), a second curve which is 2 times the AQD, and a third curve which is raw queue depth (QD). In this example, the QD is above 2 times the AQD during a time range (TR), from time X to time Y. That is, it is for this time range (TR), where the QD exceeds the AQD by the predefined threshold. If, at 204, the specialized circuitry detects such a situation, the specialized circuitry proceeds to 206. Otherwise, the specialized circuitry proceeds to 210.

At 206, since the QD exceeded the AQD by the predefined threshold at least at some point during the predefined time period for evaluation, the specialized circuitry performs further evaluation of data storage performance data 50 for the data storage equipment 24 to determine whether a performance impact event has occurred. Further details of such evaluation will be provided shortly with reference to FIG. 8.

At 208, upon completion of the closer evaluation of the data storage performance data 50 for the data storage equipment 24 at 206, if the specialized circuitry determines that a performance impact event has occurred within the data storage equipment 24, the specialized circuitry proceeds to 218. However, if the specialized circuitry fails to determine that a performance impact event occurred within the data storage equipment 24, the specialized circuitry proceeds to 210.

At 210, when the specialized circuitry failed to discover a performance impact event, the specialized circuitry further processes queue depth data from the data storage equipment 24. However, rather than use raw queue depth (QD), the specialized circuitry uses calculated queue depth (CQD). In particular, the NQP at a particular time may be computed from the average IOPS and raw latency at that time. The average IOPS may be computed over a relatively long period of time such as the same predefined evaluation time period used for computing the average queue depth (e.g., 24 hours), although other amounts of time are suitable for use as well (e.g., 8 hours, 12 hours, 48 hours, etc.).

At 212, in a manner similar to that explained above at 204, the specialized circuitry performs another preliminary evaluation to determine whether a performance impact event has occurred during that predefined evaluation time period. In particular, the specialized circuitry compares the calculated queue depth (CQD) to the average queue depth (AQD) to determine whether the CQD exceeds the AQD by a predefined threshold. Again, suitable predefined thresholds include 150% of the AQD, 200% of the AQD (or 2 times AQD), 250% of the AQD, and so on. Also, a suitable time period over which the AQD is computed is 24 hours although other amounts of time are suitable for use as well (e.g., 12 hours, 48 hours, etc.).

It should be appreciated that this situation under evaluation would look similar to the curves of FIG. 7. However, the curve for the QD would be replaced with a curve for the CQD. If the CQD exceeds the AQD by the predefined threshold (e.g., by a factor of 2), the specialized circuitry proceeds from 212 to 214 to perform a closer evaluation. However, if the CQD does not exceed the AQD by the predefined threshold, the specialized circuitry proceeds from 212 to 202.

At 214, the specialized circuitry performs further evaluation of data storage performance data 50 for the data storage equipment 24 (FIG. 1) to determine whether a performance impact event has occurred. Again, further details of such evaluation will be provided shortly with reference to FIG. 8.

At 216, upon completion of the closer evaluation of the data storage performance data 50 for the data storage equipment 24 at 214, if the specialized circuitry determines that a performance impact event has occurred within the data storage equipment 24, the specialized circuitry proceeds to 218. However, if the specialized circuitry did not determine that a performance impact event occurred within the data storage equipment 24, the specialized circuitry proceeds to 202.

At 218, when the specialized circuitry considers a performance impact event to have occurred, the specialized circuitry launches a set of perform impact operations to address the performance impact event. Upon completion of 218, the specialized circuitry may proceed back to 202 thus enabling the specialized circuitry to continue evaluating the data storage performance data 50 from the data storage equipment 24 for performance impact events in a real time ongoing manner.

In connection with 218, suppose that a user of the performance impact event processing device 26 is viewing at least some of the data storage performance data 50 from the data storage equipment 24. For example, the user may be operating a GUI (also see the other componentry 68 in FIG. 2) to monitor the operation of the data storage equipment 24.

If the specialized circuitry determines that a performance impact event has occurred during the time range (TR), the specialized circuitry may highlight a region of the GUI (e.g., between times X and Y) to identify this situation to the user. Other remedial operations are suitable as well such as transmitting a notification (e.g., an email, a text message, an alert, etc.) to the user, adjusting operation of the data storage equipment 24 (e.g., changing a policy or rule, adding resources, migrating a workload, etc.), and so on.

It should be appreciated that activities 202 through 208 evaluate raw queue depth (QD). Such evaluation takes a view of the data storage performance data from an online transaction processing (OLTP) perspective where, if IOPS is generally steady (e.g., see FIG. 4), the raw (or time-specific) queue depth (QD) tends to mirror the raw (or time-specific) latency.

In contrast, the activities 210 through 216 (FIG. 6) evaluate calculated queue depth (CQD). Such evaluation takes a view of the data storage performance data from an online analytics processing (OLAP) perspective where, IOPS may not be steady (e.g., see FIG. 5). Accordingly, the queue depth is calculated by applying Equation (1) to average IOPS rather than raw (or time-specific) IOPS.

It should be appreciated that performing the OLTP pass first and the OLAP pass second enables the specialized circuitry to discern which scenario a given performance impact event falls into (e.g., for behavior/characterization purposes). On the other hand, if there is already a spike in the QD, it would only be more pronounced in the NQP so if, instead, the NQP were evaluated first and a performance impact event were discovered, the procedure would miss an opportunity to evaluate the QD. Further details will now be provided with reference to FIG. 8.

FIG. 8 is a flowchart of a procedure 300 which includes a set of example evaluation operations that may be performed by the specialized circuitry of the performance impact event processing device 26 (FIG. 1) once the specialized circuitry has determined that the data storage performance data 50 from the data storage equipment 24 should be more closely evaluated for a possible performance impact event occurring within data storage equipment 24. Recall that such data storage performance data 50 may be saved locally in a repository (or log) (also see the specialized instructions and data 74 in FIG. 2).

Such a closer evaluation situation may occur at 206 and/or at 214 in the procedure 200 (FIG. 6) in accordance with certain embodiments. It is here, at 206 and 214, where the specialized circuitry performs preliminary evaluation of certain data storage performance data to determine whether such data should be evaluated more closely.

Suppose that the specialized circuitry has determined that the QD time series exceeds the AQD time series by the predefined threshold for the data storage equipment 24 under evaluation. In particular, at 206 of the procedure 200 (also see FIG. 6), suppose that specialized circuitry determined that a portion of the QD time series exceeds the AQD time series by the predefined threshold, e.g., by a factor of 2 (also see FIG. 7). Here, the specialized circuitry then performs the procedure 300 to evaluate the data storage performance data more closely starting at 302.

At 302, the specialized circuitry identifies a time range (TR) in which a performance impact event may have occurred. For example, with reference back to FIG. 7, recall that the QD time series exceeds the AQD time series by the predefined threshold between time X and time Y. Accordingly, the specialized circuitry considers the time range (TR) between times X and Y as the evaluation window for closer evaluation.

At 304, the specialized circuitry performs an evaluation operation to determine whether negative covariance exists between raw latency and raw IOPS received from the data storage equipment 24 during the evaluation window (i.e., between time X and time Y). The specialized circuitry may retrieve such data storage performance data from a local repository (also see the specialized instructions and data 74 in FIG. 2). In accordance with certain embodiments, the specialized circuitry may apply one or more thresholds, parameters, and/or other criteria to delineate edge certain case situations.

If the specialized circuitry determines that negative covariance exists between raw latency and raw IOPS for the data storage equipment 24 during the evaluation window, the specialized circuitry proceeds to 306. However, if the specialized circuitry determines that negative covariance does not exist between raw latency and raw IOPS for the data storage equipment 24 during the evaluation window, the specialized circuitry proceeds to 316.

At 306, the specialized circuitry performs another evaluation operation to determine whether the average IOPS during the time range (TR) (i.e., between times X and Y, also see FIG. 7) is lower than the average IOPS during the entire predefined evaluation time period (e.g., 24 hours). In particular, the specialized circuitry computes the average IOPS for both time frames and compares the two.

If the specialized circuitry determines that the average IOPS during the time range (TR) is lower than the average IOPS during the entire evaluation time period, the specialized circuitry proceeds to 308. However, if the specialized circuitry determines that the average IOPS during the time range (TR) is not lower than the average IOPS during the entire evaluation window, the specialized circuitry proceeds to 316.

At 308, the specialized circuitry performs yet another evaluation operation to determine whether strong correlation exists between read percentage (i.e., the percentage of operations that are performed by the data storage equipment that are read operations) and raw latency during the evaluation window (i.e., between time X and time Y). Again, in accordance with certain embodiments, the specialized circuitry may apply one or more thresholds, parameters, and/or other criteria to delineate edge certain case situations. For example, strong correlation may be any correlation over X where suitable values for X include 0.6, 0.7, 0.8, etc.

If the specialized circuitry determines that strong correlation exists between read percentage and raw latency during the evaluation window (e.g., where correlation is above 0.7), the specialized circuitry proceeds to 310. However, if the specialized circuitry determines that strong correlation does not exist between read percentage and raw latency during the evaluation window (e.g., where correlation is not above 0.7), the specialized circuitry proceeds to 316.

At 310, the specialized circuitry performs another evaluation operation to determine whether strong inverse correlation exists between read percentage and raw latency during the evaluation window (i.e., between time X and time Y). Again, in accordance with certain embodiments, the specialized circuitry may apply one or more thresholds, parameters, and/or other criteria to delineate edge certain case situations. For example, strong inverse correlation may be any correlation over X where suitable values for X include $-0.6$, $-0.7$, $-0.8$, etc.

If the specialized circuitry determines that strong inverse correlation exists between read percentage and raw latency during the evaluation window (e.g., where correlation is below $-0.7$), the specialized circuitry proceeds to 312. However, if the specialized circuitry determines that strong inverse correlation does not exist between read percentage and raw latency during the evaluation window (e.g., where correlation is not less than $-0.7$), the specialized circuitry proceeds to 316.

At 312, the specialized circuitry performs another evaluation operation to determine whether strong correlation exists between raw latency and I/O size during the evaluation window (i.e., between time X and time Y). Again, in accordance with certain embodiments, the specialized circuitry may apply one or more thresholds, parameters, and/or other criteria to delineate edge certain case situations.

If the specialized circuitry determines that strong correlation exists between raw latency and I/O size during the evaluation window, the specialized circuitry proceeds to 314. However, if the specialized circuitry determines that strong correlation does not exist between raw latency and I/O size during the evaluation window, the specialized circuitry proceeds to 316.

At 314, the specialized circuitry concludes that a performance impact event has occurred and returns (or outputs) an appropriate result. In particular, the specialized circuitry indicates that a performance impact has been detected within the time range (TR) and specifies the time range (TR) by identifying time X and time Y.

At 316, the specialized circuitry concludes that a performance impact event has not occurred and returns (or outputs) an appropriate result. In particular, although the specialized circuitry determined that raw queue depth (QD) exceeded the average queue depth (AQD) by a predefined threshold (e.g., a ratio of 2-to-1) (also see the activity 204 in FIG. 6), the specialized circuitry concludes that no performance impact event occurred during this time.

It should be understood that the certain evaluation operation may be performed in different orders. For example, the activities 308, 310, 312 may occur in a different order.

Additionally, other evaluation operations may be added, and/or one or more evaluation operations may be change or even removed to determine whether the data storage equipment 24 has encountered a performance impact event. Each evaluation operation may be viewed as a particular filter, or criteria matching mechanism, to determine whether the performance data indicates that the performance impact event has occurred.

Furthermore, it should be understood that the procedure 300 may be performed on the data storage equipment 24 as a whole, and/or on lower level storage objects of the data storage equipment 24 such as at the LUN level to identify performance impact events occurring on particular LUNs. Accordingly, if the procedure 300 is performed on both the data storage equipment 24 as a whole and on individual LUNs, the procedure 300 provides a result indicating which of these, if any, encountered a performance impact event.

It should be understood that the specialized circuitry may perform the procedure 300 as at least part of the activity 206 (also see FIG. 6), and that the procedure 300 may return a result indicating that no performance impact event was discovered. Nevertheless, the specialized circuitry may again perform the procedure 300 as at least part of the activity 214 to determine whether a performance impact event has occurred.

In some arrangements, the procedure 200 may perform the procedure 300 during both the OLTP case and the OLAP case. Moreover, the specialized circuitry may discover different results in each case. For example, the specialized circuitry may detect performance impact events occurring on some LUNs in the OLTP pass, and may detect performance impact events occurring on other LUNs in the OLAP pass.

As described above, improved techniques are directed to identifying performance impact events occurring on data storage equipment 24 based on queue depth metrics. Such queue depth metrics may be electronically derived from performance data 50 that is routinely received from the data storage equipment 24 (e.g., IOPS data, latency data, etc.) and used to identify a time frame within which a possible performance impact event has occurred. Once the time frame has been identified, particular performance data for that time frame may be evaluated against predefined criteria (e.g., covariances in certain data time series, correlations between certain data, whether certain data exceeds certain thresholds, etc.) to identify whether an actual performance impact event took place. If it is concluded that an actual performance impact event took place, a set of performance impact operations may be launched to address the performance impact event.

One should appreciate that the above-described techniques do not merely collect, analyze, and display data. Rather, the disclosed techniques involve an improvement to the technology by diagnosing poor performance events that occur within data storage equipment 24. With such techniques, other advantages are available as well such as changing the operation of the data storage equipment 24 (e.g., to reduce latency, to improve throughput, to migrate and/or change workloads, etc.), and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, as described herein, one should appreciate that certain storage systems strive to balance the demands of many workloads, each with their own unique storage profile. These workloads share the various resources of the storage systems, from front-end and back-end adapters, to storage processors and disks.

However, when application performance degrades as a result of contention on the underlying storage system it can often be a painstaking process for a human administrator to identify and troubleshoot. Accordingly, there may be a need for a solution that can help a customer identify when a data storage system is truly being impacted.

In accordance with certain embodiments, specialized circuitry applies a performance impact detection algorithm that is able to identify when a given workload has experienced a performance impacting event. The specialized circuitry may apply the concept of Little's Law and time series covariance to detect when a storage array's IOPS is inversely correlated with a rise in latency that indicates the system does not have enough resources to satisfy the workload, etc. The specialized circuitry detects potential impacts by monitoring a system for significant spikes in the queue depth, or virtual queue depth, which may be calculated using Little's Law. During the time window where queue depth is spiking, the specialized circuitry checks to see if IOPS and latency have a significant inverse covariance. The specialized circuitry may also ensure that IOPS are less than their localized average before and after the event. If these conditions hold, the specialized circuitry considers this a performance impacting event.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of managing data storage equipment, the method comprising:

obtaining first queue depth metrics from data storage performance data describing data storage performance of the data storage equipment, the first queue depth metrics including a first series of time-specific queue depth values, each time-specific queue depth value representing a current queue depth for the data storage equipment at a respective point in time;

performing a performance impact detection operation on the first queue depth metrics to determine whether a first performance impacting event has occurred on the data storage equipment, the performing of the performance impact detection operation comprising:

from the first series of time-specific queue depth values, computing an average queue depth value over a predefined period of time;

identifying, within the predefined period of time, a time range in which a portion of the first series of time-specific queue depth values exceeds the average queue depth value; and performing a first set of evaluation operations on the data storage performance data within an evaluation window defined by the identified time range; and in response to a result of the performance impact detection operation indicating that the first performance impacting event has occurred on the data storage equipment, launching a set of performance impact operations to address the first performance impacting event that occurred on the data storage equipment.

2. A method as in claim 1 wherein obtaining the first queue depth metrics from the data storage performance data includes:
    acquiring input/output (I/O) operations per second (IOPS) data and latency data from the data storage equipment, and
    deriving the first queue depth metrics from the IOPS data and the latency data acquired from the data storage equipment.

3. A method as in claim 2 wherein performing the performance impact detection operation on the first queue depth metrics further includes:
    performing a set of comparison operations to determine whether time-specific queue depth values of the portion of the first series of time-specific queue depth values exceeds the average queue depth value by a predefined queue depth threshold.

4. A method as in claim 3 wherein performing the performance impact detection operation on the first queue depth metrics further includes:
    in response to one or more of the time-specific queue depth values of the portion of the first series of time-specific queue depth values exceeding the average queue depth value by the predefined queue depth threshold, performing the first set of evaluation operations on the data storage performance data.

5. A method as in claim 4 wherein the IOPS data includes a series of time-specific IOPS values;
    wherein the latency data includes a series of time-specific latency values; and
    wherein performing the first set of evaluation operations on the data storage performance data over the time range includes:
        performing a negative covariance operation to determine whether negative covariance that exceeds a negative covariance threshold exists between a portion of the series of time-specific IOPS values and a portion of the series of time-specific latency values during the time range.

6. A method as in claim 4 wherein the IOPS data includes a series of time-specific IOPS values; and
    wherein performing the first set of evaluation operations on the data storage performance data over the time range includes:
        from the series of time-specific IOPS values, computing a first average IOPS value over the predefined period of time and a second average IOPS value over the time range, and
        performing a comparison operation to determine whether the second IOPS value is lower than the first IOPS value.

7. A method as in claim 4 wherein the latency data includes a series of time-specific latency values;
    wherein the data storage performance data further includes a series of time-specific read percentage values identifying percentages of read operations performed by the data storage equipment at respective points in time; and
    wherein performing the first set of evaluation operations on the data storage performance data over the time range includes:
        performing a positive correlation operation to determine whether positive correlation that exceeds a predefined positive correlation threshold exists between a portion of the series of time-specific latency values and a portion of the series of time-specific read percentage values over the time range.

8. A method as in claim 4 wherein the latency data includes a series of time-specific latency values;
    wherein the data storage performance data further includes a series of time-specific read percentage values identifying percentages of read operations performed by the data storage equipment at respective points in time; and
    wherein performing the first set of evaluation operations on the data storage performance data over the time range includes:
        performing an inverse correlation operation to determine whether inverse correlation that exceeds a predefined inverse correlation threshold exists between a portion of the series of time-specific latency values and a portion of the series of time-specific read percentage values over the time range.

9. A method as in claim 4 wherein the latency data includes a series of time-specific latency values;
    wherein the data storage performance data further includes a series of time-specific I/O size distributions describing distributions of I/O sizes for I/O operations performed by the data storage equipment at respective points in time; and
    wherein performing the first set of evaluation operations on the data storage performance data over the time range includes:
        performing a positive correlation operation to determine whether positive correlation that exceeds a predefined positive correlation threshold exists between a portion of the series of time-specific latency values and a portion of the series of time-specific I/O size distributions over the time range.

10. A method as in claim 2 wherein the IOPS data includes a series of time-specific IOPS values; and
    wherein deriving the first queue depth metrics includes:
        computing the first series of time-specific queue depth values from the series of time-specific IOPS values, each time-specific queue depth value being based on a respective time-specific IOPS value of the series of time-specific IOPS values to enable performance impact detection from an online transaction processing (OLTP) perspective.

11. A method as in claim 2 wherein the IOPS data includes a series of time-specific IOPS values; and
    wherein deriving the first queue depth metrics includes:
        computing an average IOPS value from the series of time-specific IOPS values, and
        computing the first series of time-specific queue depth values from the average IOPS value, each time-specific queue depth value being based on the average IOPS value to enable performance impact detection from an online analytical processing (OLAP) perspective.

12. A method as in claim 2 wherein the IOPS data includes a series of time-specific IOPS values; and
    wherein deriving the first queue depth metrics includes:
        computing an average IOPS value from the series of time-specific IOPS values,
        computing the first series of time-specific queue depth values from the series of time-specific IOPS values, each time-specific queue depth value of the first series being based on a respective time-specific IOPS value of the series of time-specific IOPS values to enable performance impact detection from an online transaction processing (OLTP) perspective, and
        computing a second series of time-specific queue depth values from the average IOPS value, each time-specific queue depth value of the second series being based on the average IOPS value to enable performance impact detection from an online analytical processing (OLAP) perspective.

13. A method as in claim 1 wherein the data storage equipment includes storage devices and storage processing circuitry constructed and arranged to perform data storage operations on the storage devices on behalf of a set of host computers;
  wherein launching the set of performance impact operations includes:
    while the storage processing circuitry of the data storage equipment performs data storage operations on the storage devices on behalf of the set of host computers, performing a set of computerized remedial operations in response to the result of the performance impact detection operation.

14. A method as in claim 13 wherein performing the set of computerized remedial operations includes:
  in a graphical user interface (GUI) window that displays a chart of particular data storage performance of the data storage equipment versus time, highlighting at least a portion of the chart to identify occurrence of the performance impact event.

15. A method as in claim 13 wherein performing the set of computerized remedial operations includes:
  transmitting an alert notification to a client device to identify occurrence of the performance impact event to a user of the client device.

16. A method as in claim 13 wherein performing the set of computerized remedial operations includes:
  providing a set of commands to the data storage equipment to adjust operation of the data storage equipment.

17. Electronic circuitry, comprising:
  a communications interface constructed and arranged to communicate with the data storage equipment;
  memory; and
  control circuitry coupled to the communications interface and the memory, the memory storing instructions which, when carried out by the control circuitry, cause the control circuitry to:
    obtain queue depth metrics from data storage performance data describing data storage performance of data storage equipment, the queue depth metrics including a series of time-specific queue depth values, each time-specific queue depth value representing a current queue depth for the data storage equipment at a respective point in time, at least some of the data storage performance data having been received through the communications interface,
    perform a performance impact detection operation on the queue depth metrics to determine whether a performance impacting event has occurred on the data storage equipment, the performance impact detection operation comprising:
      from the series of time-specific queue depth values, computing an average queue depth value over a predefined period of time;
      identifying, within the predefined period of time, a time range in which a portion of the series of time-specific queue depth values exceeds the average queue depth value; and
      performing a set of evaluation operations on the data storage performance data within an evaluation window defined by the identified time range; and
    in response to a result of the performance impact detection operation indicating that the performance impacting event has occurred on the data storage equipment, launch a set of performance impact operations to address the performance impacting event that occurred on the data storage equipment.

18. A computer program product having a non-transitory computer readable medium which stores a set of instructions to manage data storage equipment; the set of instructions, when carried out by computerized circuitry, causing the computerized circuitry to perform a method of:
  obtaining queue depth metrics from data storage performance data describing data storage performance of the data storage equipment, the queue depth metrics including a series of time-specific queue depth values, each time-specific queue depth value representing a current queue depth for the data storage equipment at a respective point in time;
  performing a performance impact detection operation on the queue depth metrics to determine whether a performance impacting event has occurred on the data storage equipment, the performing of the performance impact detection operation comprising:
    from the series of time-specific queue depth values, computing an average queue depth value over a predefined period of time;
    identifying, within the predefined period of time, a time range in which a portion of the series of time-specific queue depth values exceeds the average queue depth value; and
    performing a set of evaluation operations on the data storage performance data within an evaluation window defined by the identified time range; and
  in response to a result of the performance impact detection operation indicating that the performance impacting event has occurred on the data storage equipment, launching a set of performance impact operations to address the performance impacting event that occurred on the data storage equipment.

19. A method as in claim 1 wherein the obtaining of the queue depth metrics includes computing the series of time-specific queue depth values from (i) a series of time-specific IOPS values and (ii) a series of time-specific latency values.

20. A method as in claim 19 further comprising:
  in response to the result of the performance impact detection operation indicating that the first performance impacting event has not occurred on the data storage equipment:
    obtaining second queue depth metrics, the obtaining of the second queue depth metrics including computing a second series of time-specific queue depth values from (i) an average of the series of time-specific IOPS values and (ii) the series of time-specific latency values;
    determining that a portion of the second series of time-specific queue depth values exceeds the average queue depth value within the predefined period of time;
    performing a second set of evaluation operations on the data storage performance data within the evaluation window defined by the identified time range; and
    in response to a result of the second set of evaluation operations indicating that a second performance impacting event has occurred on the data storage equipment, launching a second set of performance impact operations to address the second performance impacting event that occurred on the data storage equipment.

* * * * *